United States Patent Office 3,029,280
Patented Apr. 10, 1962

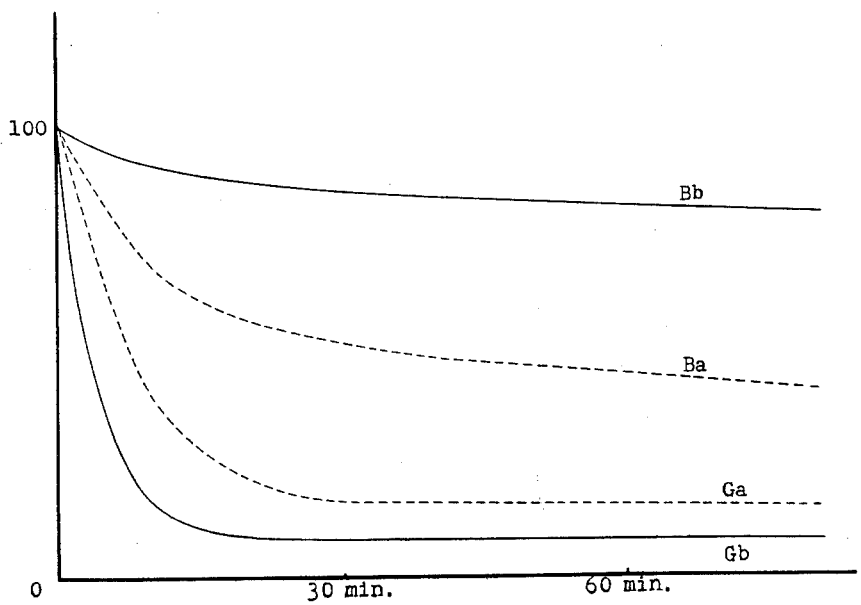

3,029,280
PROCESS FOR RECOVERING GLUTAMIC ACID FROM FERMENTATION BROTH
Shinichi Motozaki and Mei Ohno, Tokyo, and Kotaro Fujiwara, Kamakura-shi, Japan, assignors to Ajinomoto Co., Inc., Tokyo, Japan
Filed Sept. 15, 1959, Ser. No. 840,048
Claims priority, application Japan May 27, 1959
2 Claims. (Cl. 260—527)

The present invention relates to a process for recovering glutamic acid and especially concerns a process for obtaining crystals of glutamic acid or its salts (hereinafter included in the term "glutamic acid") from the fermentation broth.

It is among the objects of this invention to crystallize glutamic acid in a preferred state, avoiding the formation of glutamic acid crystals with inferior crystal habit and with minute dimensions, in order to separate glutamic acid easily from glutamic acid fermentation broth.

Another object is to obtain glutamic acid crystals with higher purity, free from cells and other impurities from the fermentation broth, without the need for filtering or centrifuging the cells.

A further object is to obtain glutamic acid from the broth, with a good yield and at a low cost.

Yet another object is to obtain a by-product which may be utilized as a seasoning liquor for cooking which contains various kinds of amino acid.

Other objects will become apparent from the following specification and claims.

Glutamic acid fermentation broth always contains cells which are difficult to filter off, and residual carbohydrates. The cells become pseudo nuclei of glutamic acid crystallization. They deteriorate the crystal habit and intermix into crystallized glutamic acid to degrade its purity. The remnant carbohydrates also counteract the crystallization and the growth of crystals to form so minute glutamic acid crystals of extremely inferior crystal habit that the separation of crystals can hardly be carried out in an industrial operation. The inferior crystal habit means, in this specification, the formation of so minute crystals of needle-, spindle- or thin tabular shape of less than 10μ or amorphous deposit. Previous separation of both the cells and the remnant carbohydrates have been accordingly believed to be indispensable in the treatment of glutamic acid fermentation broth.

The inventors have found that the principal cause of such obstruction of crystallization by the bacterial cells lies in the heat-treatment for sterilization and concentration of the broth after fermentation, that the bacterial cells denatured by said heat-treatment are apt to become pseudo nuclei of glutamic acid crystals, that the cells partly dispersed by said heat-treatment especially retard the growth of crystals and that, when the broth is heated, the sedimentation velocity of the cells increases to such an extent that their separation from glutamic acid crystals becomes extremely difficult.

These findings have led to a new process for recovering glutamic acid from the fermentation broth in which glutamic acid is crystallized in superior crystal habit from the broth still containing the cells and then separated from the cells by means of decantation or classification. According to the process which will be hereinafter explained in detail, the essentially difficult separation of the cells from the broth may be omitted, and glutamic acid crystals of high purity may be recovered with a high yield and, furthermore, the cells are simultaneously hydrolyzed in an acid-treatment of the mother liquor.

(1) Relations between the ratio of sedimentation velocities of the cells in a broth containing 4% of wet cells just after the fermentation and the several broths just after heat-treatment for sterilization under various conditions are shown in Table 1.

TABLE 1

|  | Before heat-treatment | After heat-treatment under the conditions of | | |
|---|---|---|---|---|
|  |  | 80° C., 10 min. | 100° C., 10 min. | 115° C., 10 min. |
| Ratio of sedimentation velocities | 100 | 130 | 150 | 160 |

Thus the sedimentation velocity of the cells tends to approach that of glutamic acid crystals when the broth is heated, the difference decreasing with temperature. The difference between the sedimentation velocity of glutamic acid crystals and that of the cells in the heated broth is further decreased, if the broth is adjusted to approximately pH 3 which is the necessary condition for crystallization of glutamic acid. The accompanying drawing illustrates how the sedimentation velocities of cells and crystals approach each other when the fermentation broth, which was heated at 100° C. for 10 minutes, is acidified to pH 3. The ordinate denotes the extent to which the cells and crystals sedimented and the abscissa the sedimentation period. Bb and Ba are respectively the curves of sedimentation of the cells before and after the heat-treatment, while Gb and Ga are the respective curves of sedimentation of glutamic acid crystals before and after the heat-treatment. It will be understood from the drawing that, when the fermentation broth is heated, the sedimentation velocity of crystallized glutamic acid is decreased (moreover, its crystal habit also becomes worse, as hereinafter described) while that of the bacterial cells increased, and such mutual approach of both sedimentation velocities causes further difficulty of separation of the cells and crystals. The heat-treatment for sterilization of the broth after the completion of fermentation and before the crystallization of glutamic acid should be therefore avoided.

However, if the fermentation broth is left as it is, without sterilizing it, after-fermentation takes place and the glutamic acid content decreases, or the broth spoils and difficulties arise in the crystal separation step. Some measures must be devised against it. It has been found that, if the pH of the broth is adjusted to 2.5–3.5 immediately after the fermentation is completed, instead of the heat-treatment, the after-fermentation and putrefaction of the broth can be avoided and favorable crystallization can be carried out. For example, acidification of a fermentation broth of pH 6.8 with hydrochloric acid to pH 3.0 and standing still at room temperature does not cause deterioration which obstructed the separation of glutamic acid crystals, even after 5 days. Since the separation of glutamic acid crystals and the acid treatment of the mother liquor are usually carried out within 3 days after the pH adjustment, such pH adjustment instead of the heat-treatment for sterilization is sufficient to suppress the after-fermentation and the putrefaction. The above is the 1st characteristic feature of the present invention.

(2) If the fermentation broth is heated first to raise the concentration of glutamic acid in order to increase the yield of crystals, the concentration of the cells is inevitably raised and the broth is denatured by the heating. The crystal habit of the obtained glutamic acid crystals thereby becomes distinctly inferior and classification of the cells and the glutamic acid is found to be impossible. A fermentation broth containing 3% of wet cells, 5% of glutamic acid and 0.8% of the remnant carbohydrates, for example, was concentrated under reduced pressure at 60° C. to ⅕ volume and the concentrated broth obtained was mixed with the unconcentrated broth, in different ratios as shown in Table 2, and then subjected to crystallization. Table 2 illustrates the fact that the crystal habit becomes worse as the concentration increases.

TABLE 2

| | | | | |
|---|---|---|---|---|
| Unconc. broth | 100 | 90 | 50 | 0 |
| Conc. broth | 0 | 10 | 50 | 100 |
| Ratio of crystal habit of glutamic acid | 12 | 30 | 53 | 57 |
| Purity of crystals (percent) | 97.5 | 95 | 90 | 88 |
| Yield of crystals (percent) | 65 | 68 | 72 | 75 |

"Ratio of crystal habit of glutamic acid crystals" means the ratio of the quantity of retained mother liquor to that of glutamic acid crystallized under certain conditions. For example, "50" means the percentage of the retained mother liquor in the obtained crystals. Many experiments proved that the smaller the said ratio is, the better the crystal habit is and that industrial separation of crystals is difficult when said ratio is larger than 30.

Since concentration of the fermentation broth increases the yield of crystals of glutamic acid but inevitably degrades the crystal habit and accordingly decreases the purity of the obtained crystals, crystallization and separation should be carried out without previously concentrating the broth so that the cells are still suspended in the broth. This means a somewhat lower yield of crystals in this stage in order to separate glutamic acid of superior habit and of higher purity and ultimately a higher yield of glutamic acid crystals. The above is the 2nd characteristic feature of this invention.

(3) Said somewhat lower yield of crystals in the first operation is more than balanced, from the second operation on, by the circulation of the mother liquor after some treatments as mentioned below. According to the present invention, the mother liquor containing the cells in suspended state is first concentrated and subjected to a hydrolyzing step wherein glutamic acid in combined form such as glutamine and pyroglutamic acid is converted to free glutamic acid and proteins constituting the bacterial cells are simultaneously hydrolyzed into various kinds of amino acid and, moreover, the remnant carbohydrates are changed into humins. Said humins are separated from the solution together with the partly remaining cells.

The filtrate obtained contains no longer much of the impurities which deteriorate the crystal habit of glutamic acid and it can be concentrated to more than 20% of glutamic acid.

According to this invention, said concentrated solution, which contains an inorganic acid used for said hydrolysis together with glutamic acid, is recycled to the fermentation broth for the next operation, in order to adjust the pH of said broth by its acidifying power and at the same time to increase the concentration of glutamic acid in said broth and the purity of the latter. Thus the solution containing mineral acid serves for pH adjustment of the broth. The above is the 3rd characteristic feature of this invention.

By the recycling of the purified acidic solution of glutamic acid, as hereinafter described in an example, the yield is increased by 2–4% due to the hydrolysis of the cells and, by 7–10% due to conversion of glutamine and pyroglutamic acid and moreover by 3–5% due to the increase of the concentration of the fermentation broth, the raw material in the next operation. Thus the total yield amounts to more than 95% based on the total content of glutamic acid including glutamine, pyroglutamic acid and glutamic acid derived from the hydrolysis of the cells, and at the same time the purity is also raised to over 95%.

The composition of the amino acids of the cells in an example of a glutamic acid fermentation broth is as follows:

| | Percent |
|---|---|
| Glutamic acid | 10.26 |
| Glycine | 4.25 |
| Valine | 5.87 |
| Isoleucine | 4.15 |
| Tyrosin | 2.15 |
| Serine | 3.44 |
| Methionine | 1.46 |
| Arginine | 5.07 |
| Lysine | 4.30 |
| Aspartic acid | 7.61 |
| Alanine | 6.69 |
| Leucine | 6.28 |
| Proline | 2.51 |
| Tryptophan | 0.64 |
| Threonine | 3.64 |
| Cystine | 0.13 |
| Histidine | 1.44 |

The waste liquor after the separation of glutamic acid in the process according to this invention contains much of all kinds of essential amino acids as shown in the foregoing table and may be partly utilized as seasoning liquor after a simple step of neutralization.

*Example*

10 kg. of a glutamic acid fermentation broth containing 1.5% of bacterial cells (by weight in dried state), 4.8% of glutamic acid in the free form (glutamic acid proper), 0.5% of glutamic acid in the form by hydrolyzable derivatives (such as glutamine and pyroglutamic acid) and 0.8% of residual sugar were gradually mixed with 1 kg. of acid-treated and concentrated mother liquor obtained in the foregoing operation, which contained 25% of glutamic acid and 20% of hydrochloric acid. Its pH was thereby adjusted to 3.0. It was cooled to 17° C. and agitated for 30 hours. The solution, in which glutamic acid had crystallized and was held in suspension together with the cells, was allowed to stand for 30 minutes in order to let glutamic acid crystals settle. The crystals were separated from the mother liquor by decantation, washed twice with 300 cc. of water, and then centrifuged. 520 g. (on the basis of 100% purity) of glutamic acid crystals of 97.5% purity were obtained.

The mother liquor still containing the suspended bacterial cells was acidified to pH 1.0 and concentrated in vacuo to 2 kg. It was mixed with 500 g. of concentrated hydrochloric acid and heated for 3 hours at 110° C. The glutamic acid derivatives and a portion of the cell proteins were hydrolyzed to free glutamic acid. The residual sugar was also transformed by the acid treatment into humins (130 g. dry weight) which were filtered off. The filtrate was concentrated to 1.3 kg. The major portion of the filtrate was returned to the fermentation broth, the raw material in the next operation. From the remaining part of said filtrate, glutamic acid was recovered according to the conventional treatments. A solution containing 3% of glutamic acid and 2.5% of amino-nitrogen was obtained. The solution was made alkaline and ammonia was evaporated off. After adjustment of pH to 5.0–5.2, 1 kg. of delicious seasoning which contained 2.0% of amino-nitrogen and 2.5% of glutamic acid was obtained.

The raw material, 10 kg. of a fermentation broth, had contained 480 g. of glutamic acid in the free form, 50 g. in the combined form and 15 g. as a constituent of the cell protein, a total of 545 g. of glutamic acid. Accordingly, the aforementioned 520 g. (converted to 100% purity) of the obtained glutamic acid crystals of 97.5% purity corresponded to a yield of 95%. If based on the free glutamic acid only yield was 108%.

What we claim is:
1. A process of recovering glutamic acid from an aqueous fermentation broth containing free glutamic acid to- gether with hydrolyzable derivatives of glutamic acid, bacterial cells, and residual carbohydrates, which comprises acidifying a portion of said broth to a pH in the range of 2.5 to 3.5 while maintaining the original water content; permitting glutamic acid to crystallize and to precipitate from the remainder of said broth at said pH at room temperature; removing the precipitated glutamic acid crystals formed from the mother liquor; acidifying the mother liquor to pH 1.0; heating said mother liquor in the presence of hydrochloric acid to an elevated temperature for a time sufficient to hydrolyze said glutamic acid derivatives and to form glutamic acid therefrom, whereby said bacterial cells are partly destroyed, and said residual carbohydrates are at least partly converted into solid humins insoluble in the liquid remainder of said liquor; and separating said humins and the remaining bacterial cells from said liquid remainder of said liquor.

2. A process as set forth in claim 1, which further comprises adding the liquid remainder obtained by said separation of said humins and of said remaining bacterial cells from said mother liquor to another portion of said broth in an amount sufficient to adjust the pH of the resulting mixture to a pH range of 2.5 to 3.5.

References Cited in the file of this patent
UNITED STATES PATENTS
2,929,839   Hoglan _____ Mar. 22, 1960